United States Patent
Mou

(10) Patent No.: US 10,509,413 B2
(45) Date of Patent: Dec. 17, 2019

(54) GROUND REFERENCE DETERMINATION FOR AUTONOMOUS VEHICLE OPERATIONS

(71) Applicant: GM GLOBAL TECHNOLOGY OPERATIONS LLC, Detroit, MI (US)

(72) Inventor: Wei Mou, South San Francisco, CA (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 205 days.

(21) Appl. No.: 15/697,962

(22) Filed: Sep. 7, 2017

(65) Prior Publication Data

US 2017/0371348 A1 Dec. 28, 2017

(51) Int. Cl.
| | | |
|---|---|---|
| G05D 1/02 | (2006.01) |
| G01S 17/02 | (2006.01) |
| G01S 17/42 | (2006.01) |
| G01S 17/87 | (2006.01) |
| G01S 17/89 | (2006.01) |
| G01S 17/93 | (2006.01) |
| G06K 9/00 | (2006.01) |
| G06K 9/46 | (2006.01) |
| G06K 9/62 | (2006.01) |

(52) U.S. Cl.
CPC .......... G05D 1/0257 (2013.01); G01S 17/023 (2013.01); G01S 17/42 (2013.01); G01S 17/87 (2013.01); G01S 17/89 (2013.01); G01S 17/936 (2013.01); G05D 1/0278 (2013.01); G06K 9/00791 (2013.01); G06K 9/00805 (2013.01); G06K 9/4628 (2013.01); G06K 9/6274 (2013.01); G05D 2201/0213 (2013.01)

(58) Field of Classification Search
CPC ............... G05D 1/0257; G05D 1/0278; G05D 2201/0213; G01D 17/023
USPC .......................................................... 701/23
See application file for complete search history.

(56) References Cited

U.S. PATENT DOCUMENTS

| | | | |
|---|---|---|---|
| 9,880,560 B2 * | 1/2018 | Han | B60R 11/04 |
| 9,916,703 B2 * | 3/2018 | Levinson | G01S 15/931 |
| 2004/0167667 A1 * | 8/2004 | Goncalves | G01C 21/12 |
| | | | 700/245 |
| 2010/0235129 A1 * | 9/2010 | Sharma | G01S 7/4972 |
| | | | 702/97 |

(Continued)

OTHER PUBLICATIONS

Jesse Levinson, Sebastian Thrun, Automatic Online Calibration of Cameras and Lasers, Stanford Artificial Intelligence Laboratory, 2013.

Primary Examiner — Tuan C To
(74) Attorney, Agent, or Firm — Lorenz & Kopf, LLP

(57) ABSTRACT

Systems and method are provided for controlling a vehicle. In one embodiment, a vehicle includes: an imaging device, a ranging device, a data storage element to maintain calibration data associated with a relationship between the imaging device and the ranging device, one or more actuators, and a controller. The controller obtains image data from the imaging device, classifies portions of the image data as ground, obtains ranging data from the ranging device, identifies a ground subset of the ranging data corresponding to the portions of the image data using the calibration data; and operates the one or more actuators onboard the vehicle in a manner that is influenced by the ground subset of the ranging data.

18 Claims, 8 Drawing Sheets

(56) References Cited

U.S. PATENT DOCUMENTS

| | | | | |
|---|---|---|---|---|
| 2010/0253594 | A1* | 10/2010 | Szczerba | G01S 13/723 345/7 |
| 2015/0049193 | A1* | 2/2015 | Gupta | G03B 43/00 348/148 |
| 2015/0278610 | A1* | 10/2015 | Renner | G06K 9/00798 340/435 |
| 2016/0132748 | A1* | 5/2016 | Tillotson | B64C 39/024 348/222.1 |
| 2016/0247106 | A1* | 8/2016 | Dalloro | G06Q 10/06313 |
| 2016/0350974 | A1* | 12/2016 | Hashimoto | B60R 1/00 |
| 2016/0358475 | A1* | 12/2016 | Prokhorov | G05D 1/0011 |
| 2017/0124781 | A1* | 5/2017 | Douillard | G01S 15/931 |
| 2017/0206426 | A1* | 7/2017 | Schrier | B60W 50/00 |
| 2017/0220874 | A1* | 8/2017 | Ayvaci | G06T 7/13 |
| 2017/0223346 | A1* | 8/2017 | Derenick | B64C 39/024 |
| 2017/0242442 | A1* | 8/2017 | Minster | G05D 1/0248 |
| 2017/0270709 | A1* | 9/2017 | Tran | B29C 64/386 |
| 2017/0278289 | A1* | 9/2017 | Marino | G06T 7/44 |
| 2018/0144202 | A1* | 5/2018 | Moosaei | G06K 9/6274 |
| 2018/0196127 | A1* | 7/2018 | Harada | G01S 7/4972 |
| 2018/0203113 | A1* | 7/2018 | Taylor | G01S 17/023 |
| 2018/0211128 | A1* | 7/2018 | Hotson | G06K 9/4604 |
| 2018/0330526 | A1* | 11/2018 | Corcoran | G06T 11/60 |
| 2018/0356526 | A1* | 12/2018 | Wang | G01S 17/89 |

* cited by examiner

GROUND REFERENCE DETERMINATION FOR AUTONOMOUS VEHICLE OPERATIONS

TECHNICAL FIELD

The present disclosure generally relates to autonomous vehicles, and more particularly relates to systems and methods for establishing a ground reference within sensor data representative of the operating environment about a vehicle to facilitate object analysis and other autonomous operations.

BACKGROUND

An autonomous vehicle is a vehicle that is capable of sensing its environment and navigating with little or no user input. An autonomous vehicle senses its environment using sensing devices such as radar, lidar, image sensors, and the like. The autonomous vehicle system further uses information from global positioning systems (GPS) technology, navigation systems, vehicle-to-vehicle communication, vehicle-to-infrastructure technology, and/or drive-by-wire systems to navigate the vehicle.

Vehicle automation has been categorized into numerical levels ranging from Zero, corresponding to no automation with full human control, to Five, corresponding to full automation with no human control. Various automated driver-assistance systems, such as cruise control, adaptive cruise control, and parking assistance systems correspond to lower automation levels, while true "driverless" vehicles correspond to higher automation levels.

To achieve high level automation, vehicles are often equipped with an increasing number of different types of devices for analyzing the environment around the vehicle, such as, for example, cameras or other imaging devices capturing imagery of the environment, radar or other ranging devices for surveying or detecting features within the environment, and the like. In practice, the different onboard devices are located at different locations onboard the vehicle and typically operate at different sampling rates or refresh rates, and as a result, capture different types of data corresponding to different points in time from different viewpoints or perspectives. Calibrating relationships between different devices improves the ability to accurately establish correlations between different types of data, which, in turn facilitate assigning attributes to objects or features within the environment more accurately, thereby improving autonomous vehicle controls.

Focusing or tuning the analysis on particular regions of sensor data can improve the performance of the analysis. Additionally, limiting the amount of sensor data under consideration can reduce the overall amount of computational resources and time associated with performing object analysis on the sensor data. Accordingly, it is desirable to delineate and partition regions of sensor data to reduce the amount of resources that could otherwise be devoted towards analysis of data unlikely to yield relevant or significant results. Other desirable features and characteristics of the present invention will become apparent from the subsequent detailed description and the appended claims, taken in conjunction with the accompanying drawings and the foregoing technical field and background.

SUMMARY

Systems and method are provided for controlling a vehicle. In one embodiment, a method includes: obtaining image data from an imaging device onboard the vehicle, classifying portions of the image data as ground, obtaining sensor data corresponding to a field of view of the imaging device from a sensing device onboard the vehicle, classifying a subset of the sensor data as ground based on a correlation between the subset of the sensor data and the portions of the image data, and operating one or more actuators onboard the vehicle in a manner that is influenced by the subset of the sensor data classified as ground.

In another embodiment, an autonomous vehicle is provided, which includes: an onboard imaging device, an onboard ranging device, a data storage element to maintain calibration data associated with a relationship between the imaging device and the ranging device, one or more actuators, and a controller. The controller obtains image data from the imaging device, classifies portions of the image data as ground, obtains ranging data from the ranging device, identifies a ground subset of the ranging data corresponding to the portions of the image data using the calibration data; and operates the one or more actuators onboard the vehicle in a manner that is influenced by the ground subset of the ranging data.

In another embodiment, a method of controlling a vehicle includes obtaining, by a control module onboard the vehicle, an image from a camera onboard the vehicle, characterizing, by the control module, pixels of the image as belonging to a roadway, obtaining, by the control module, ranging data corresponding to the image from a ranging device onboard the vehicle, classifying, by the control module, a subset of the ranging data as the roadway based on a mapping of the subset of the ranging data to locations of the pixels using calibrated transformation parameters associated with a relationship between the camera and the ranging device, and autonomously operating, by the control module, one or more actuators onboard the vehicle in a manner that is influenced by the subset of the ranging data classified as the roadway.

DESCRIPTION OF THE DRAWINGS

The exemplary embodiments will hereinafter be described in conjunction with the following drawing figures, wherein like numerals denote like elements, and wherein.

DETAILED DESCRIPTION

Figure 1:
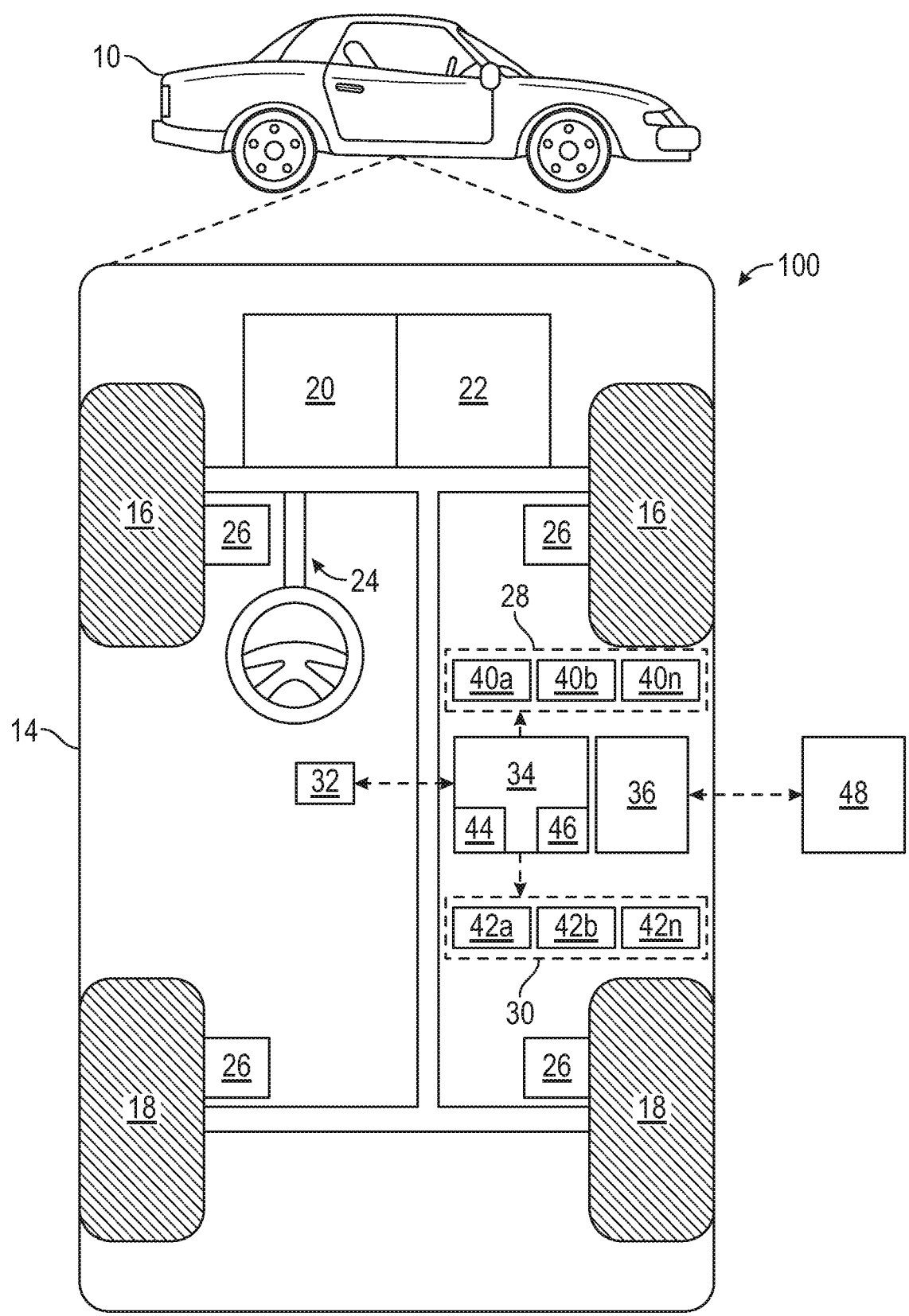
FIG. 1 is a functional block diagram illustrating an autonomous vehicle in accordance with various embodiments.

The following detailed description is merely exemplary in nature and is not intended to limit the application and uses. Furthermore, there is no intention to be bound by any expressed or implied theory presented in the preceding technical field, background, brief summary or the following detailed description. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

In one or more exemplary embodiments described herein, a vehicle capable of at least some level of autonomous operation includes a number of different devices that capture images or otherwise generate data representative of a scene or environment in a vicinity of the vehicle from different perspectives and with different sampling or refresh rates. The relationship of a particular device may be calibrated with respect to another device or reference frame, such as the vehicle reference frame or a coordinate frame of the device (or vice versa), resulting in a transformation function that may be utilized to translate from one reference frame to another to establish correlations between data sets.

For example, image data from one onboard imaging device may be correlated with ranging data from a ranging device onboard the vehicle based on the relationship between the line-of-sight and/or field of view of the imaging device and ranging data captured at instances in time during which the ranging device is surveying or scanning the field of view associated with the imaging device. Calibrating the relationship between a particular imaging device and a particular ranging device results in conversion parameter values that may be used to translate three-dimensional ranging data from the ranging device to a two-dimensional image captured by the imaging device, and vice versa. For example, coordinate locations or positions may be assigned to portions of the image using the ranging data and the conversion parameter values to translate coordinates or points within the ranging data reference frame to the image data reference frame. That is, three-dimensional points of ranging data may be correlated to two-dimensional pixel locations.

For purposes of explanation, the subject matter may be described herein primarily in the context of the imaging devices being realized as cameras and the ranging devices being realized as light detection and ranging (lidar) devices. That said, it should be appreciated that the subject matter described herein is not necessarily limited to use with optical cameras and lidars. Alternative embodiments may employ other types of cameras or imaging devices, radar or other types of ranging devices, or any number of combinations of imaging devices and ranging devices.

Exemplary embodiments described in greater detail below primarily in the context of FIGS. 4-6 generally pertain to using image classification to delineate and partition ranging data into a subset of data points that correspond to the roadway surface or ground. The ground or roadway subset of ranging data can be utilized to adjust, fine tune, or otherwise determine the current orientation of the vehicle (e.g., pitch, roll, and yaw) relative to the roadway or earth. The remaining non-ground subset of ranging data (alternatively referred to herein as the environmental subset of ranging data) can be utilized to assign depths or distances to pixels of image data and analyzed to detect objects, obstacles, or other features in the vicinity of the vehicle. Additionally, in some embodiments, the environmental subset of ranging data can be utilized in combination with mapping data for vehicle localization purposes.

In one or more embodiments, the calibrated relationship between a ranging device and an imaging device is utilized to delineate or partition ranging data into distinct subsets corresponding to roadway and non-roadway data points. In this regard, an initial subset of ranging data corresponding to the roadway is determined by mapping image pixels classified as the road or ground to corresponding points within the ranging data. For example, the image data from an imaging device may be analyzed to classify pixels within an image that correspond to the roadway. The ranging data captured when the ranging device scanned the imaging device's field of view is translated or otherwise converted to pixel locations using the calibrated transformation parameters characterizing the relationship between the imaging device and the ranging device. The points of the ranging data that are mapped to pixel locations previously classified as belonging to the roadway are then similarly classified or otherwise designated as belonging to the roadway, resulting in a roadway subset of ranging data points.

The roadway subset of ranging data identified using image classification may then be further augmented or increased by analyzing relative differences in depth or distance between a point classified as the roadway and adjacent points within the ranging data. In this regard, since the surface tangent of the ground or roadway is likely to be relatively smooth or substantially planar at the vehicle location, data points corresponding to the roadway will exhibit relatively small changes in depth or distance when moving along the roadway within the ranging data. For example, there could be bumps or other minor variations in the roadway surface such that the surface tangent is not necessarily perfectly planar, but changes to the surface tangent should be relatively smooth in the absence of obstacles or features exhibiting depth discontinuity. Thus, points adjacent to roadway points classified based on the image mapping may be analyzed and also classified as roadway points when the relative differences in depth or distance are less than a threshold, and so on, until the reaching points corresponding to objects or obstacles where changes in depth or distance exceed the threshold for classifying points as belonging to the roadway. The augmented image-classified roadway subset of ranging data can then be utilized to fine tune the vehicle orientation (e.g., pitch, roll, and yaw) based on previously mapped or surveyed pitch or elevation data for the roadway, or to perform other processing tasks dependent on a reference subset of roadway ranging data.

In other embodiments, an initial subset of ranging data corresponding to the roadway is determined based on the relative differences between adjacent points within the ranging data, and then augmented using image classification and the calibrated relationship between the ranging device and an imaging device. The ranging data is translated or otherwise converted to pixel locations, and points of the ranging data that are mapped to pixel locations classified as belonging to the roadway are classified or otherwise designated as belonging to the roadway. Thus, the initial subset of ranging data determined based on an analysis of the ranging data can be augmented to include any additional points of the ranging data that map to pixel locations classified as belonging to the roadway but were not previously included in the initial subset of ranging data.

In exemplary embodiments, the remaining subset of points of ranging data that are not classified into the roadway subset of ranging data may be designated or otherwise classified as an environmental subset of ranging data. The environmental subset of ranging data is utilized to assign depths or distances to pixels of the image data (e.g., by mapping those points to corresponding pixel locations using the calibration data). Additionally, the environmental subset of ranging data may be analyzed (either independently of or in combination with the image data) to detect, classify, track, or otherwise analyze objects, obstacles, or other features in the vicinity of the vehicle. In some embodiments, the environmental subset of ranging data is also compared to mapping data (e.g., high-resolution three-dimensional map data, and/or the like) to determine the current location of the vehicle relative to previously mapped features (e.g., traffic signals), or conversely, to determine the relative location of those previously mapped features based on the relationship between the environmental subset of ranging data and the mapping data corresponding to the estimated vehicle location. For example, global positioning system data or other location data may be utilized to obtain an initial estimate of the current vehicle location, mapping data corresponding to the estimated vehicle location may be obtained an analyzed in relation to the environmental subset of ranging data to determine the current vehicle location and/or orientation in the context of the mapping data coordinate frame of reference.

Based on the current vehicle pose in the mapping reference frame, the relative orientations of previously mapped features relative to the current vehicle pose may be identified and mapped to expected pixel regions where those features are expected to be located based on the mapping data. The expected object pixel regions are then analyzed to detect and classify those features (e.g., the current traffic signal state), which, in turn, may influence subsequent autonomous operation of the vehicle. In this regard, ranging data points that map to the expected object pixel regions may be utilized to assign physical or dimensional attributes to the expected object pixel regions to improve accuracy or reliability of the detection and classification processes.

Referring now to FIG. 1, in accordance with one or more embodiments, an autonomous vehicle control system shown 100 determines a motion plan for autonomously operating a vehicle 10 along a route in a manner that accounts for objects or obstacles detected by onboard sensors 28, 40, as described in greater detail below. In this regard, a control module onboard the autonomous vehicle 10 calibrates different types of onboard sensors 28, 40 with respect to one another and/or the vehicle 10, thereby allowing data from those different types of onboard sensors 28, 40 to be spatially associated or otherwise with one another based on the calibration, thereby improving object detection, object classification, and the resulting autonomous operation of the vehicle 10.

As depicted in FIG. 1, the vehicle 10 generally includes a chassis, a body 14, and front and rear wheels 16, 18 rotationally coupled to the chassis near a respective corner of the body 14. The body 14 is arranged on the chassis and substantially encloses components of the vehicle 10, and the body 14 and the chassis may jointly form a frame.

In exemplary embodiments, the vehicle 10 is an autonomous vehicle and the control system 100 is incorporated into the autonomous vehicle 10 (hereinafter referred to as the autonomous vehicle 10). The autonomous vehicle 10 is, for example, a vehicle that is automatically controlled to carry passengers from one location to another. The vehicle 10 is depicted in the illustrated embodiment as a passenger car, but it should be appreciated that any other vehicle including motorcycles, trucks, sport utility vehicles (SUVs), recreational vehicles (RVs), marine vessels, aircraft, etc., can also be used. In an exemplary embodiment, the autonomous vehicle 10 is a so-called Level Four or Level Five automation system. A Level Four system indicates "high automation", referring to the driving mode-specific performance by an automated driving system of all aspects of the dynamic driving task, even if a human driver does not respond appropriately to a request to intervene. A Level Five system indicates "full automation", referring to the full-time performance by an automated driving system of all aspects of the dynamic driving task under all roadway and environmental conditions that can be managed by a human driver.

As shown, the autonomous vehicle 10 generally includes a propulsion system 20, a transmission system 22, a steering system 24, a brake system 26, a sensor system 28, an actuator system 30, at least one data storage device 32, at least one controller 34, and a communication system 36. The propulsion system 20 may, in various embodiments, include an internal combustion engine, an electric machine such as a traction motor, and/or a fuel cell propulsion system. The transmission system 22 is configured to transmit power from the propulsion system 20 to the vehicle wheels 16, 18 according to selectable speed ratios. According to various embodiments, the transmission system 22 may include a step-ratio automatic transmission, a continuously-variable transmission, or other appropriate transmission. The brake system 26 is configured to provide braking torque to the vehicle wheels 16, 18. The brake system 26 may, in various embodiments, include friction brakes, brake by wire, a regenerative braking system such as an electric machine, and/or other appropriate braking systems. The steering system 24 influences a position of the of the vehicle wheels 16, 18. While depicted as including a steering wheel for illustrative purposes, in some embodiments contemplated within the scope of the present disclosure, the steering system 24 may not include a steering wheel.

The sensor system 28 includes one or more sensing devices 40a-40n that sense observable conditions of the exterior environment and/or the interior environment of the autonomous vehicle 10. The sensing devices 40a-40n can include, but are not limited to, radars, lidars, global positioning systems, optical cameras, thermal cameras, ultrasonic sensors, and/or other sensors. The actuator system 30 includes one or more actuator devices 42a-42n that control one or more vehicle features such as, but not limited to, the propulsion system 20, the transmission system 22, the steering system 24, and the brake system 26. In various embodiments, the vehicle features can further include interior and/or exterior vehicle features such as, but are not limited to, doors, a trunk, and cabin features such as air, music, lighting, etc. (not numbered).

The data storage device 32 stores data for use in automatically controlling the autonomous vehicle 10. In various embodiments, the data storage device 32 stores defined maps of the navigable environment. In various embodiments, the defined maps may be predefined by and obtained from a remote system (described in further detail with regard to FIG. 2). For example, the defined maps may be assembled by the remote system and communicated to the autonomous vehicle 10 (wirelessly and/or in a wired manner) and stored in the data storage device 32. As can be appreciated, the data storage device 32 may be part of the controller 34, separate from the controller 34, or part of the controller 34 and part of a separate system.

The controller 34 includes at least one processor 44 and a computer readable storage device or media 46. The processor 44 can be any custom made or commercially available processor, a central processing unit (CPU), a graphics processing unit (GPU), an auxiliary processor among several processors associated with the controller 34, a semiconductor based microprocessor (in the form of a microchip or chip set), a macroprocessor, any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the autonomous vehicle 10.

The instructions may include one or more separate programs, each of which comprises an ordered listing of executable instructions for implementing logical functions. The instructions, when executed by the processor 44, receive and process signals from the sensor system 28, perform logic, calculations, methods and/or algorithms for automatically controlling the components of the autonomous vehicle 10, and generate control signals to the actuator system 30 to automatically control the components of the autonomous vehicle 10 based on the logic, calculations, methods, and/or algorithms. Although only one controller 34 is shown in FIG. 1, embodiments of the autonomous vehicle 10 can include any number of controllers 34 that communicate over any suitable communication medium or a combination of communication mediums and that cooperate to process the sensor signals, perform logic, calculations, methods, and/or algorithms, and generate control signals to automatically control features of the autonomous vehicle 10.

In various embodiments, one or more instructions of the controller 34 are embodied in the control system 100 (e.g., in data storage element 46) and, when executed by the processor 44, cause the processor 44 to obtain data captured or generated from imaging and ranging devices 40 and utilize calibrated relationships between the devices 40 to classify data points from ranging devices 40 into roadway and environmental subsets, as described in greater detail below. Thereafter, the processor 44 may utilize the image-classified roadway ranging data to fine tune vehicle orientation determinations while utilizing the remaining environmental ranging data to improve vehicle localization and perform obstacle detection, classification, tracking, and related analysis. In this regard, detected objects and their classification and predicted behavior influences the travel plans for autonomously operating the vehicle 10, which, in turn, influences commands generated or otherwise provided by the processor 44 to control actuators 42.

Figure 2:
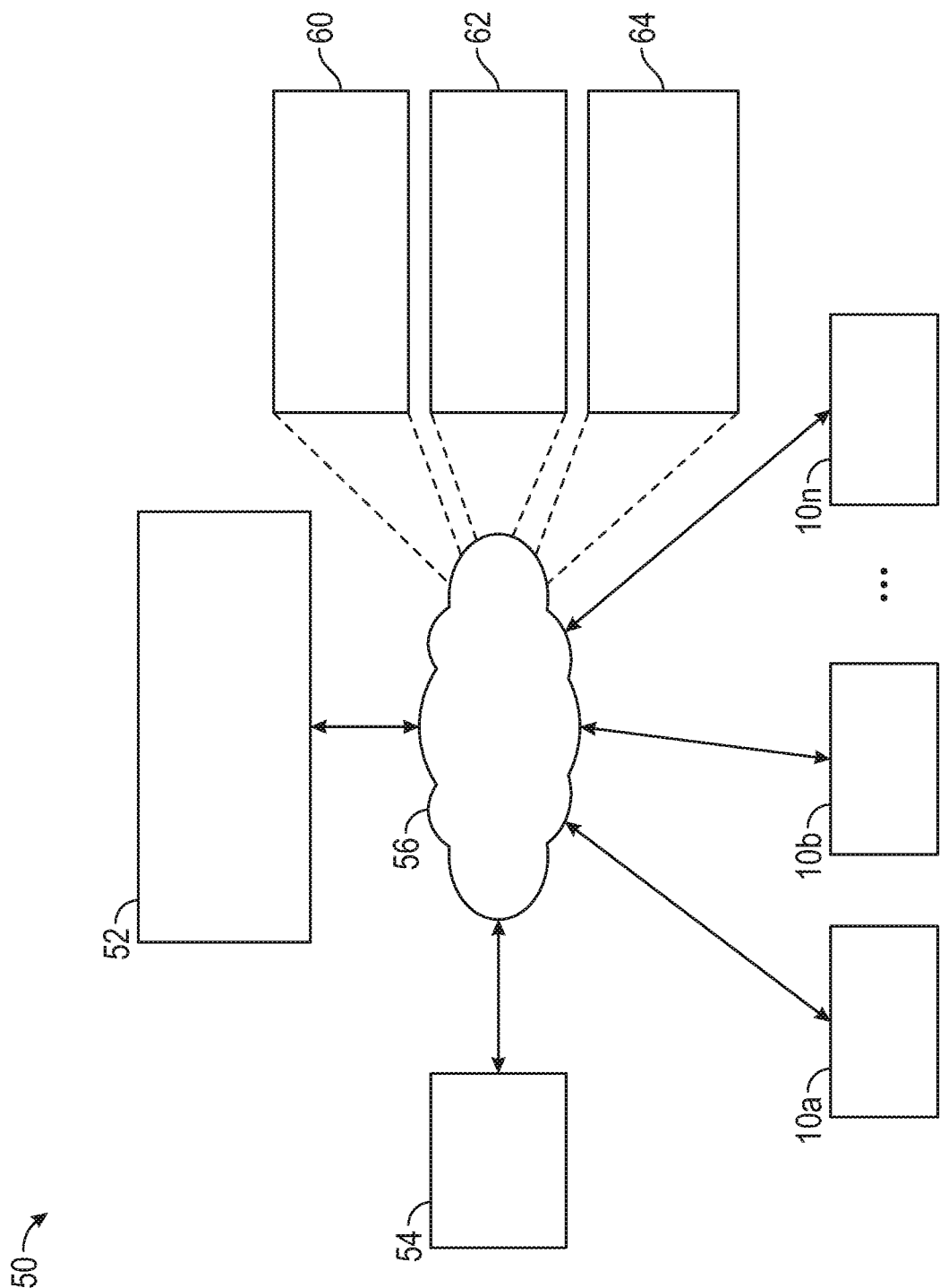
FIG. 2 is a functional block diagram illustrating a transportation system having one or more autonomous vehicles of FIG. 1, in accordance with various embodiments.

Still referring to FIG. 1, in exemplary embodiments, the communication system 36 is configured to wirelessly communicate information to and from other entities 48, such as but not limited to, other vehicles ("V2V" communication,) infrastructure ("V2I" communication), remote systems, and/or personal devices (described in more detail with regard to FIG. 2). In an exemplary embodiment, the communication system 36 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

With reference now to FIG. 2, in various embodiments, the autonomous vehicle 10 described with regard to FIG. 1 may be suitable for use in the context of a taxi or shuttle system in a certain geographical area (e.g., a city, a school or business campus, a shopping center, an amusement park, an event center, or the like) or may simply be managed by a remote system. For example, the autonomous vehicle 10 may be associated with an autonomous vehicle based remote transportation system. FIG. 2 illustrates an exemplary embodiment of an operating environment shown generally at 50 that includes an autonomous vehicle based remote transportation system 52 that is associated with one or more instances of autonomous vehicles 10a-10n as described with regard to FIG. 1. In various embodiments, the operating environment 50 further includes one or more user devices 54 that communicate with the autonomous vehicle 10 and/or the remote transportation system 52 via a communication network 56.

The communication network 56 supports communication as needed between devices, systems, and components supported by the operating environment 50 (e.g., via tangible communication links and/or wireless communication links). For example, the communication network 56 can include a wireless carrier system 60 such as a cellular telephone system that includes a plurality of cell towers (not shown), one or more mobile switching centers (MSCs) (not shown), as well as any other networking components required to connect the wireless carrier system 60 with a land communications system. Each cell tower includes sending and receiving antennas and a base station, with the base stations from different cell towers being connected to the MSC either directly or via intermediary equipment such as a base station controller. The wireless carrier system 60 can implement any suitable communications technology, including for example, digital technologies such as CDMA (e.g., CDMA2000), LTE (e.g., 4G LTE or 5G LTE), GSM/GPRS, or other current or emerging wireless technologies. Other cell tower/base station/MSC arrangements are possible and could be used with the wireless carrier system 60. For example, the base station and cell tower could be co-located at the same site or they could be remotely located from one another, each base station could be responsible for a single cell tower or a single base station could service various cell towers, or various base stations could be coupled to a single MSC, to name but a few of the possible arrangements.

Apart from including the wireless carrier system 60, a second wireless carrier system in the form of a satellite communication system 64 can be included to provide unidirectional or bi-directional communication with the autonomous vehicles 10a-10n. This can be done using one or more communication satellites (not shown) and an uplink transmitting station (not shown). Uni-directional communication can include, for example, satellite radio services, wherein programming content (news, music, etc.) is received by the transmitting station, packaged for upload, and then sent to the satellite, which broadcasts the programming to subscribers. Bi-directional communication can include, for example, satellite telephony services using the satellite to relay telephone communications between the vehicle 10 and the station. The satellite telephony can be utilized either in addition to or in lieu of the wireless carrier system 60.

A land communication system 62 may further be included that is a conventional land-based telecommunications network connected to one or more landline telephones and connects the wireless carrier system 60 to the remote transportation system 52. For example, the land communication system 62 may include a public switched telephone network (PSTN) such as that used to provide hardwired telephony, packet-switched data communications, and the Internet infrastructure. One or more segments of the land communication system 62 can be implemented through the use of a standard wired network, a fiber or other optical network, a cable network, power lines, other wireless networks such as wireless local area networks (WLANs), or networks providing broadband wireless access (BWA), or any combination thereof. Furthermore, the remote transportation system 52 need not be connected via the land communication system 62, but can include wireless telephony equipment so that it can communicate directly with a wireless network, such as the wireless carrier system 60.

Although only one user device 54 is shown in FIG. 2, embodiments of the operating environment 50 can support any number of user devices 54, including multiple user devices 54 owned, operated, or otherwise used by one person. Each user device 54 supported by the operating environment 50 may be implemented using any suitable hardware platform. In this regard, the user device 54 can be realized in any common form factor including, but not limited to: a desktop computer; a mobile computer (e.g., a tablet computer, a laptop computer, or a netbook computer); a smartphone; a video game device; a digital media player; a piece of home entertainment equipment; a digital camera or video camera; a wearable computing device (e.g., smart watch, smart glasses, smart clothing); or the like. Each user device 54 supported by the operating environment 50 is realized as a computer-implemented or computer-based device having the hardware, software, firmware, and/or processing logic needed to carry out the various techniques and methodologies described herein. For example, the user device 54 includes a microprocessor in the form of a programmable device that includes one or more instructions stored in an internal memory structure and applied to receive binary input to create binary output. In some embodiments, the user device 54 includes a GPS module capable of receiving GPS satellite signals and generating GPS coordinates based on those signals. In other embodiments, the user device 54 includes cellular communications functionality such that the device carries out voice and/or data communications over the communication network 56 using one or more cellular communications protocols, as are discussed herein. In various embodiments, the user device 54 includes a visual display, such as a touch-screen graphical display, or other display.

The remote transportation system 52 includes one or more backend server systems, which may be cloud-based, network-based, or resident at the particular campus or geographical location serviced by the remote transportation system 52. The remote transportation system 52 can be manned by a live advisor, or an automated advisor, or a combination of both. The remote transportation system 52 can communicate with the user devices 54 and the autonomous vehicles 10a-10n to schedule rides, dispatch autonomous vehicles 10a-10n, and the like. In various embodiments, the remote transportation system 52 stores store account information such as subscriber authentication information, vehicle identifiers, profile records, behavioral patterns, and other pertinent subscriber information.

In accordance with a typical use case workflow, a registered user of the remote transportation system 52 can create a ride request via the user device 54. The ride request will typically indicate the passenger's desired pickup location (or current GPS location), the desired destination location (which may identify a predefined vehicle stop and/or a user-specified passenger destination), and a pickup time. The remote transportation system 52 receives the ride request, processes the request, and dispatches a selected one of the autonomous vehicles 10a-10n (when and if one is available) to pick up the passenger at the designated pickup location and at the appropriate time. The transportation system 52 can also generate and send a suitably configured confirmation message or notification to the user device 54, to let the passenger know that a vehicle is on the way.

As can be appreciated, the subject matter disclosed herein provides certain enhanced features and functionality to what may be considered as a standard or baseline autonomous vehicle 10 and/or an autonomous vehicle based remote transportation system 52. To this end, an autonomous vehicle and autonomous vehicle based remote transportation system can be modified, enhanced, or otherwise supplemented to provide the additional features described in more detail below.

Figure 3:
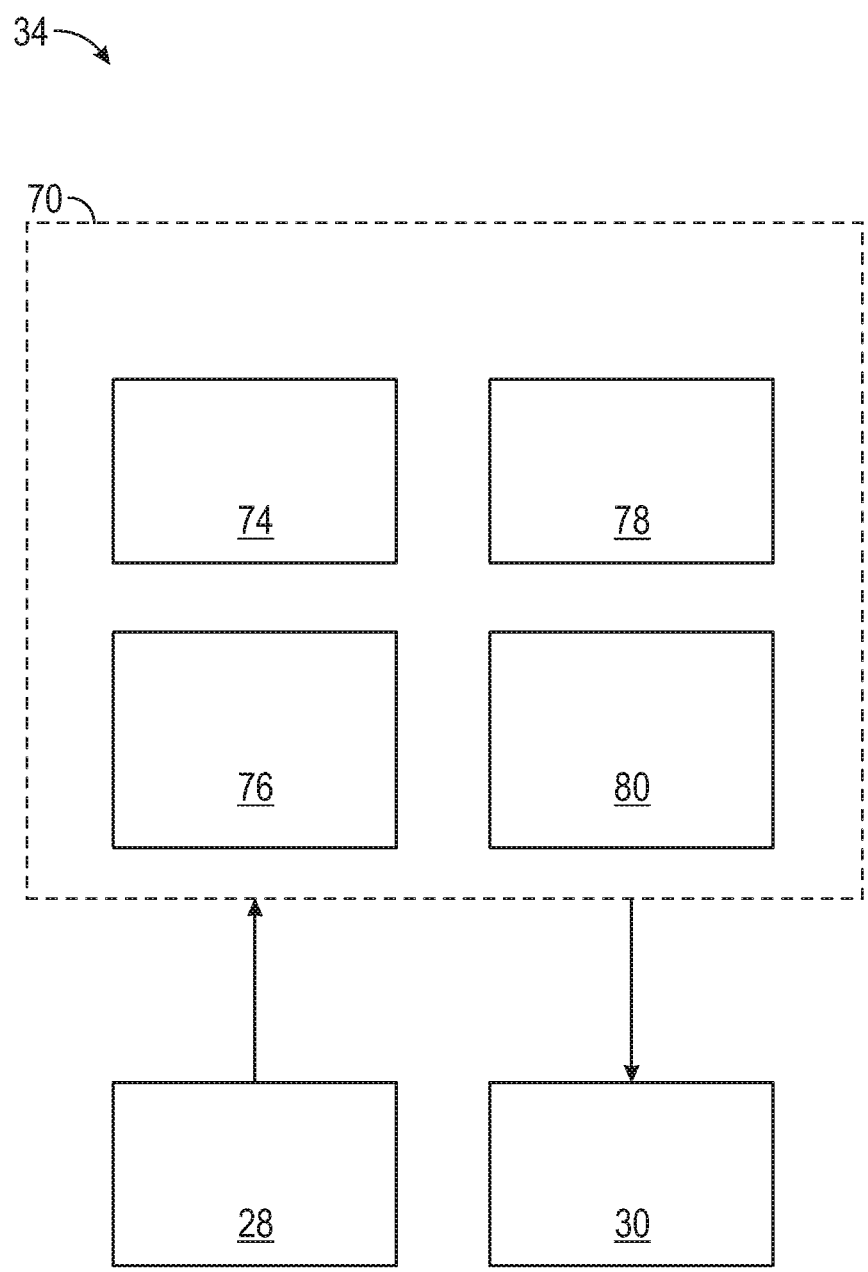
FIG. 3 is a schematic block diagram of an automated driving system (ADS) suitable for implementation by the vehicle of FIG. 1 in accordance with various embodiments.

Referring now to FIG. 3, in accordance with various embodiments, controller 34 implements an autonomous driving system (ADS) 70 as shown in FIG. 3. That is, suitable software and/or hardware components of controller 34 (e.g., processor 44 and computer-readable storage device 46) are utilized to provide an autonomous driving system 70 that is used in conjunction with vehicle 10, for example, to automatically control various actuators 30 and thereby control vehicle acceleration, steering, and braking, respectively, without human intervention.

In various embodiments, the instructions of the autonomous driving system 70 may be organized by function or system. For example, as shown in FIG. 3, the autonomous driving system 70 can include a sensor fusion system 74, a positioning system 76, a guidance system 78, and a vehicle control system 80. As can be appreciated, in various embodiments, the instructions may be organized into any number of systems (e.g., combined, further partitioned, etc.) as the disclosure is not limited to the present examples.

In various embodiments, the sensor fusion system 74 synthesizes and processes sensor data and predicts the presence, location, classification, and/or path of objects and features of the environment of the vehicle 10. In various embodiments, the sensor fusion system 74 can incorporate information from multiple sensors, including but not limited to cameras, lidars, radars, and/or any number of other types of sensors. In one or more exemplary embodiments described herein, the sensor fusion system 74 supports or otherwise performs the ground reference determination processes described herein and in greater detail below primarily in the context of FIG. 6. In exemplary embodiments, the sensor fusion system 74 correlates image data to lidar point cloud data, the vehicle reference frame, or some other reference coordinate frame using calibrated conversion parameter values associated with the pairing of the respective camera and reference frame to relate lidar points to pixel locations, assign depths to the image data, identify objects in one or more of the image data and the lidar data, or otherwise synthesize associated image data and lidar data. In other words, the sensor output from the sensor fusion system 74 provided to the vehicle control system 80 (e.g., indicia of detected objects and/or their locations relative to the vehicle 10) reflects or is otherwise influenced by the calibrations and associations between camera images, lidar point cloud data, and the like.

The positioning system 76 processes sensor data along with other data to determine a position (e.g., a local position relative to a map, an exact position relative to lane of a road, vehicle heading, velocity, etc.) of the vehicle 10 relative to the environment. The guidance system 78 processes sensor data along with other data to determine a path for the vehicle 10 to follow. The vehicle control system 80 generates control signals for controlling the vehicle 10 according to the determined path.

In various embodiments, the controller 34 implements machine learning techniques to assist the functionality of the controller 34, such as feature detection/classification, obstruction mitigation, route traversal, mapping, sensor integration, ground-truth determination, and the like.

Figure 4:
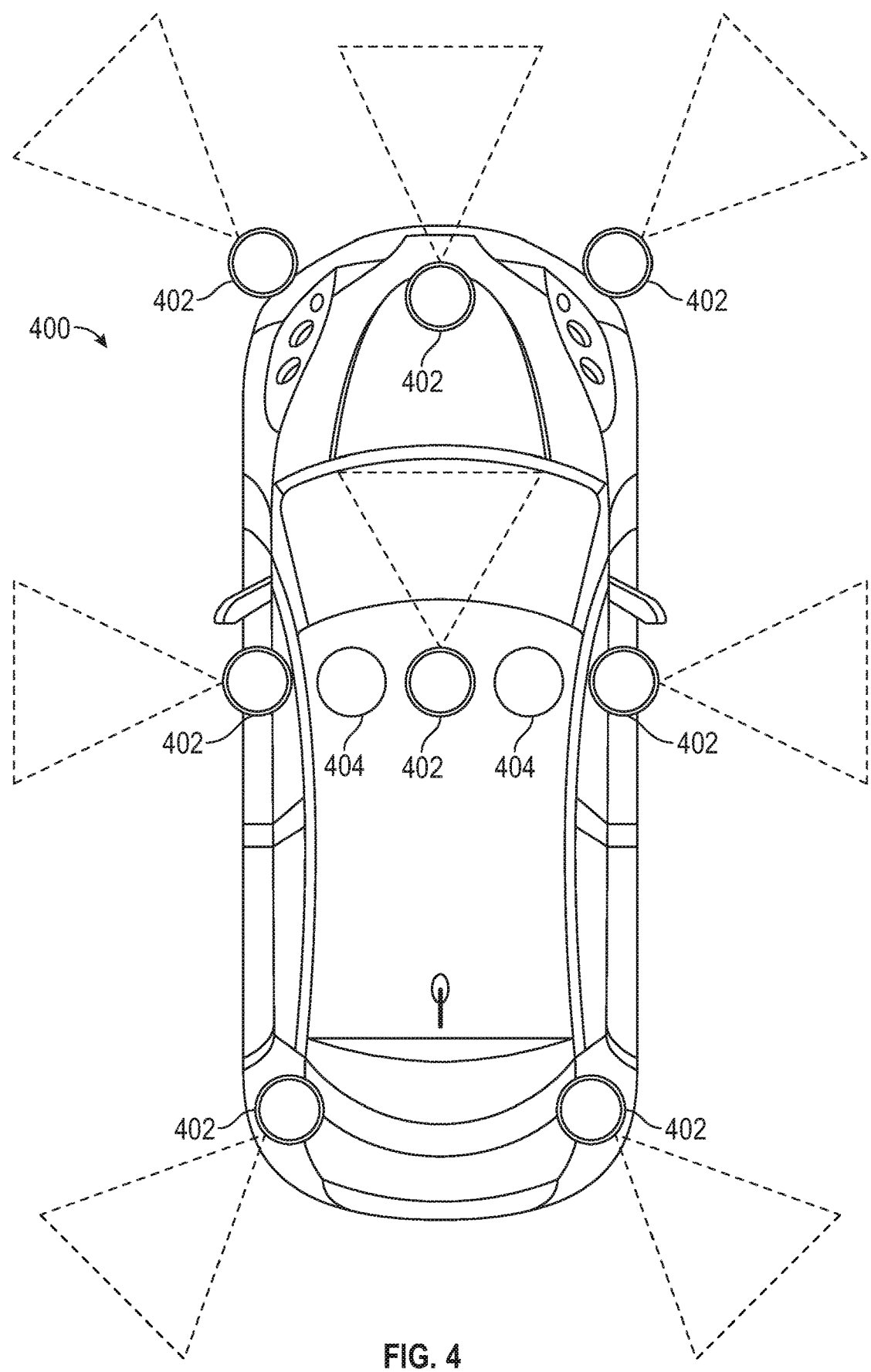
FIG. 4 is an illustration of an arrangement of a plurality of imaging devices and a plurality of ranging devices onboard a vehicle such as the autonomous vehicle of FIG. 1 in accordance with various embodiments.

FIG. 4 depicts an exemplary vehicle 400 that includes a plurality of cameras 402 distributed about the vehicle 400 and a plurality of ranging devices 404 distributed about the vehicle 400. The cameras 402 are disposed at different locations and oriented to provide different field of views that capture different portions of the surrounding environment in the vicinity of the vehicle 400. For example, a first camera 402 is positioned at the front left (or driver) side of the vehicle 400 and has its field of view oriented 45° counterclockwise relative to the longitudinal axis of the vehicle 400 in the forward direction, and another camera 402 may be positioned at the front right (or passenger) side of the vehicle 400 and has its field of view oriented 45° clockwise relative to the longitudinal axis of the vehicle 400. Additional cameras 402 are positioned at the rear left and right sides of the vehicle 400 and similarly oriented away from the longitudinal axis at 45° relative to the vehicle longitudinal axis, along with cameras 402 positioned on the left and right sides of the vehicle 400 and oriented away from the longitudinal axis perpendicular to the vehicle longitudinal axis. The illustrated embodiment also includes a pair of cameras 402 positioned at or near the vehicle longitudinal axis and oriented to capture a forward looking field of view along a line of sight substantially parallel to the vehicle longitudinal axis.

In exemplary embodiments, the cameras 402 have angle of views, focal lengths, and other attributes that may be different from those of one or more other cameras 402. For example, the cameras 402 on the right and left sides of the vehicle may have an angle of view that is greater than the angle of view associated with the cameras 402 positioned at the front left, front right, rear left, or rear right of the vehicle. In some embodiments, the angle of view of the cameras 402 are chosen so that the field of view of different cameras 402 overlap, at least in part, to ensure camera coverage at particular locations or orientations relative to the vehicle 400.

One of more ranging devices 404 are also disposed at different locations of the vehicle 400, and in one embodiment, are disposed symmetrically about the longitudinal axis of the vehicle 400 to achieve parallax. In exemplary embodiments described herein, the ranging devices 404 are realized as lidar devices. In this regard, each of the ranging devices 404 may include or incorporate one or more lasers, scanning components, optical arrangements, photodetectors, and other components suitably configured to horizontally and rotatably scan the environment in the vicinity of the vehicle 400 with a particular angular frequency or rotational velocity. For example, in one embodiment, each lidar device 404 is configured to horizontally rotate and scan 360° at a frequency of 10 Hertz (Hz). As used herein, a lidar scan should be understood as referring to a single revolution of a lidar device 404.

In exemplary embodiments described herein, the cameras 402 autonomously and automatically captures images at a particular frequency, which may be greater than the angular frequency of the lidar devices 404. In one embodiment, the frequency or sampling rate of the cameras 402 is at least twice the angular frequency of the lidar device 404. For example, the cameras 402 may capture new image data corresponding to their respective field of view at a rate of 30 Hz while the lidar device 404 scans and automatically provides updated data at a rate of 10 Hz. Thus, each camera 402 may capture multiple images per lidar scan, and capture the images at different times independent of the orientation of the lidar device 404 or the angular position within the scan. In such embodiments, an image from each respective camera 402 that is temporally associated with the lidar point cloud data from a particular lidar scan may be selected or identified based on the relative time difference between when the image is obtained and when the angular position of the lidar scan corresponds to the line of sight of a lidar device 404 being aligned with the line of sight or the angle of view of the respective camera 402.

In other embodiments, images obtained during a lidar scan may be fused or otherwise combined to achieve a representative image corresponding to the lidar scan. In yet other embodiments, the cameras 402 may be triggered or otherwise controlled to capture images at the instance in time during a lidar scan when the angular position of the lidar scan corresponds to the line of sight of a lidar device 404 being aligned with the line of sight or the angle of view of the respective camera 402. In this regard, it should be understood there are numerous different ways to synchronize or temporally associate different data sets, and the subject matter described herein is not intended to be limited to any particular manner for identifying or associating image data of a region with a lidar scan of that region or corresponding lidar data representative of that region.

Figure 5:
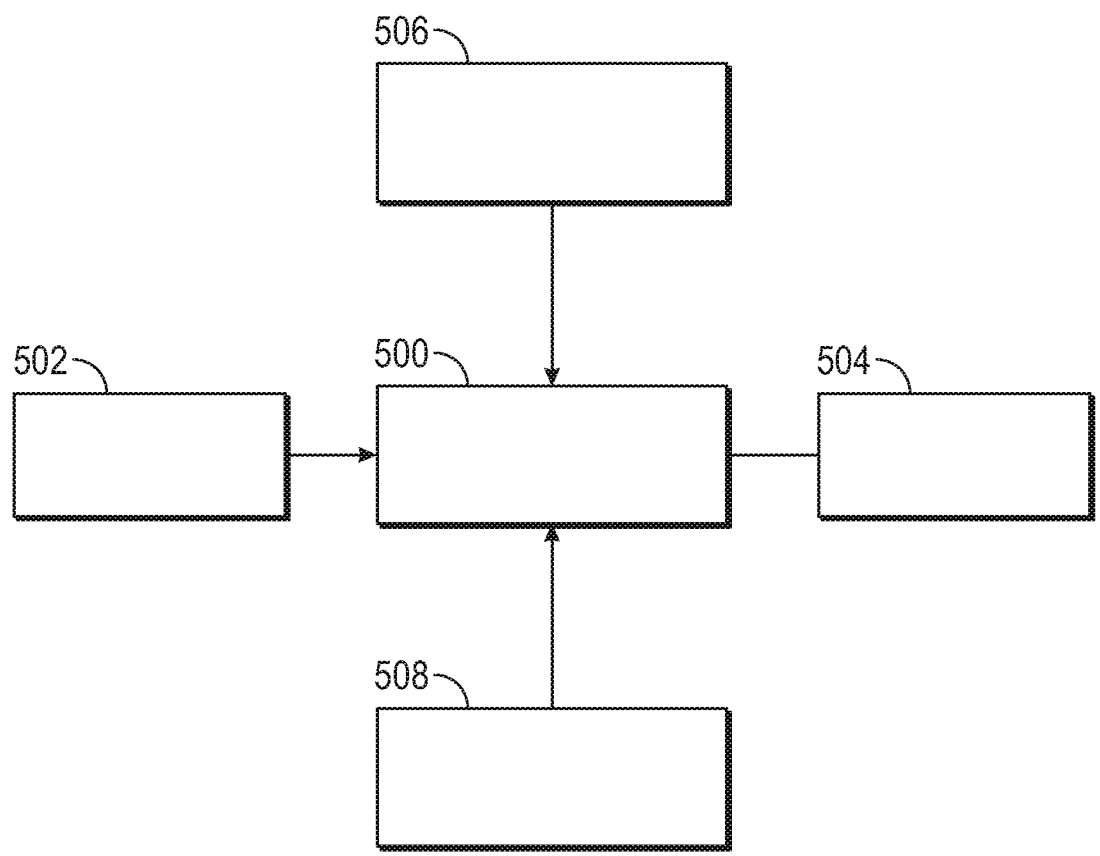
FIG. 5 is a block diagram of a processing module for implementation onboard the vehicle of FIG. 1 or FIG. 4 in accordance with one or more exemplary embodiments.

FIG. 5 depicts an embodiment of a processing module 500 (or control module) which may be implemented by or incorporated into the controller 34, the processor 44, and/or the sensor fusion system 74. The processing module 500 is coupled to an imaging device 502 onboard the vehicle (e.g., one of cameras 402) and a ranging device 508 (e.g., one of lidar devices 404). For purposes of explanation, the subject matter is described herein in the context of the onboard sensing devices 502, 508 being realized as a camera and a lidar device, however, it should be appreciated the processes described herein are not limited to any particular type of device and may be implemented in an equivalent manner for other types of devices. Additionally, it should be noted that although FIG. 5 depicts individual devices 502, 508, in practice, the processing module 500 may be coupled to multiple sensing devices 40, 402, 404 onboard a vehicle 10, 400 to perform the processes described herein with respect to multiple devices 40, 402, 404 substantially concurrently or in parallel.

In exemplary embodiments, the processing module 500 calibrates the relationships between respective coordinate frames of the sensing devices 502, 508 and one or more different coordinate frames. For example, the camera reference frame may be calibrated with respect to a coordinate frame referenced to the vehicle pose (e.g., the vehicle reference frame) or a coordinate frame associated with the lidar device 508, or vice versa. The processing module 500 stores or otherwise maintains the calibration data characterizing the relationships for transforming between reference frames in the data storage element 504. In this regard, the calibration data may include values for variables of a function for spatially translating from the lidar point cloud reference frame to the camera reference frame, or vice versa. Thereafter, when correlating subsequent image data with lidar point cloud data or other environmental data, the processing module 500 may utilize the calibration data to assign attributes to the image data, or vice versa. For example, in one or more embodiments, the processing module 500 is configured to buffer, store or otherwise maintain image data corresponding to one or more images (or samples) captured by the camera 502 per lidar scan and select or otherwise identify a captured image temporally associated with the lidar scan of the camera field of view. The transformation parameter values may then be utilized to project lidar data from the scan of the camera field of view onto the image data (e.g., by converting lidar point cloud data points to pixel locations in the image reference frame) to assign depths, distances, or other dimensional characteristics to the selected image, or alternatively, utilize the image data to classify or identify regions of interest within the lidar data based on the calibrated relationship.

As described in greater detail below in the context of FIG. 6, the processing module 500 performs classification on the image data from the camera 502 to individually classify pixels of the image data as belonging to the roadway or ground. For example, a convolutional neural network or another suitable image classification algorithm may be applied to classify pixels of the image data in a particular manner. In exemplary embodiments, the processing module 500 utilizes the calibration between the camera 502 and the lidar device 508 to assign the classification of particular image pixels identified as belonging to the roadway or ground to corresponding data points within the lidar point cloud data that are mapped to the locations of those particular image pixels based on the calibration transformation parameter values. Additional lidar points within the lidar point cloud data adjacent to those classified as belonging to the roadway based on the image mapping may be analyzed to increase the size of the roadway subset of lidar point cloud data points to include those adjacent lidar points having a difference in depth or distance relative to the neighboring roadway lidar point that is less than a threshold value.

The resulting subsets of roadway lidar points and non-roadway environmental lidar points are then utilized by the processing module 500 for purposes of vehicle orientation determinations, vehicle localization determinations, object detection and classification, and the like. For example, the processing module 500 may be coupled to a vehicle positioning system 506 (which could be implemented as part of or in conjunction with positioning system 76), which processes sensor data to determine the current velocity, acceleration, heading, and pose of the vehicle. In exemplary embodiments, the current vehicle pose includes coordinates that define the position or location of the vehicle with respect to the Earth and pitch, roll, and yaw values that define the orientation of the vehicle with respect to the Earth. For example, the positioning system 506 may receive latitude and longitude coordinates of the vehicle from a GPS receiver onboard the vehicle, and then utilize the spatial coordinates of the vehicle to obtain mapping data corresponding to the location from the map database 504. Using the mapping data corresponding to surface of the road and environment surrounding the vehicle along with the environmental lidar data subset, the processing module 500 can determine a current three-dimensional coordinate location and heading of the vehicle with respect to the coordinate frame of the mapping data. The processing module 500 may also utilize the roadway lidar data subset along with mapping data corresponding to surface of the road to determine current pitch, roll, and yaw values for the vehicle relative to the roadway surface.

Figure 6:
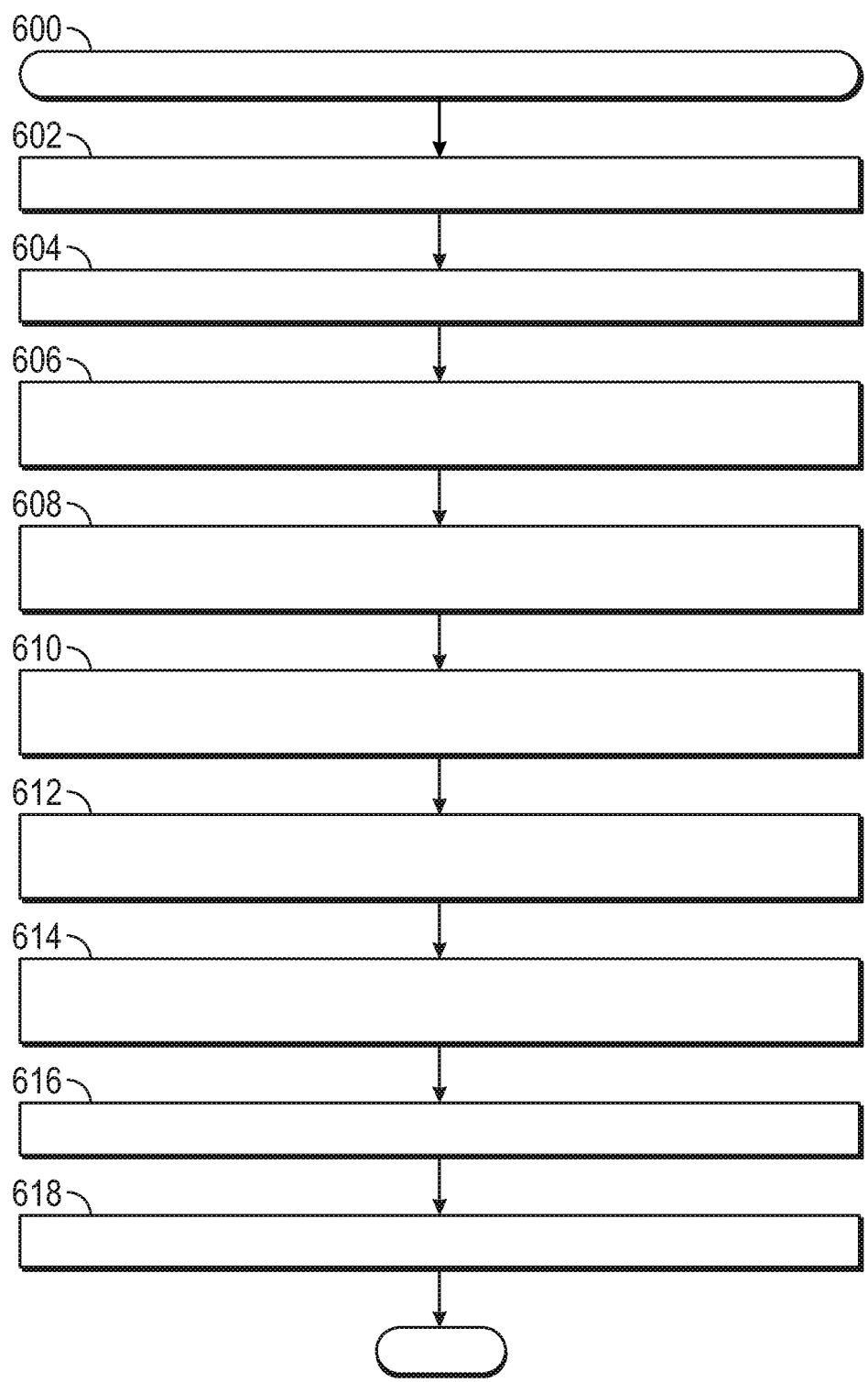
FIG. 6 is a flowchart illustrating a ground reference determination process in accordance with one or more exemplary embodiments.

Referring now to FIG. 6, and with continued reference to FIGS. 1-5, a flow diagram illustrates various embodiments of a ground reference determination process 600 which may be embedded within a controller 34 in the control system 100 of FIG. 1 supporting the ADS 70. In this regard, one or more control modules 34, 44, 500 onboard a vehicle 10, 400 may implement or otherwise perform the ground reference determination process 600. The order of operation within the method is not limited to execution sequentially as depicted in FIG. 6, but may be performed in one or more varying orders as applicable and in accordance with the present disclosure. Moreover, one or more of the tasks shown and described in the context of FIG. 6 could be omitted from a practical embodiment of the ground reference determination process 600 while still achieving the generally intended overall functionality. In various embodiments, the ground reference determination process 600 can be scheduled to run based on one or more predetermined events, and/or can run periodically or continually during operation of the autonomous vehicle 10, 400.

In exemplary embodiments, the ground reference determination process 600 is performed for each 360° scan by a lidar device 404, 508 to classify the three-dimensional lidar point cloud data into distinct subsets corresponding to either the roadway or the surrounding environment. Accordingly, for each respective pairing of a particular onboard camera 402, 502 and a respective lidar device 404, 508, the subset of lidar point cloud data overlapping or otherwise corresponding to the field of view of the respective camera 402, 502 is mapped or correlated to pixel locations within the image reference frame of that camera 402, 502 to classify lidar points as belonging to the roadway or ground. Once the lidar point cloud data is analyzed with respect to each of the cameras 402, 502, the lidar point cloud data may be further analyzed to classify additional lidar points as belonging to the roadway or ground based on their differences in depth or distance relative to adjacent roadway lidar points being less than a threshold amount. The resulting roadway subset of lidar data is then utilized to determine the orientation of the vehicle (e.g., roll, pitch, and yaw) during the lidar scan, while the non-roadway environmental subset of lidar data is utilized to localize the vehicle (e.g., location and heading) within a three-dimensional mapping reference coordinate frame. Thereafter, the vehicle pose can be utilized to identify regions of interest within the image data or the lidar point cloud data for further object analysis.

In exemplary embodiments, the ground reference determination process 600 begins by receiving or otherwise obtaining image data from a respective onboard imaging device at 602 and classifying or otherwise characterizing pixels of the image data as corresponding to the roadway or ground at 604. For example, a control module 34, 500 onboard the vehicle may select an image from an onboard camera 402, 502 that is temporally associated with a lidar device 404, 508 scanning the field of view of that camera 402, 502, and then input or otherwise provide the image data corresponding to the selected image data to an image classification algorithm to individually designate pixels of the image as belonging to the roadway or ground.

Figure 7:
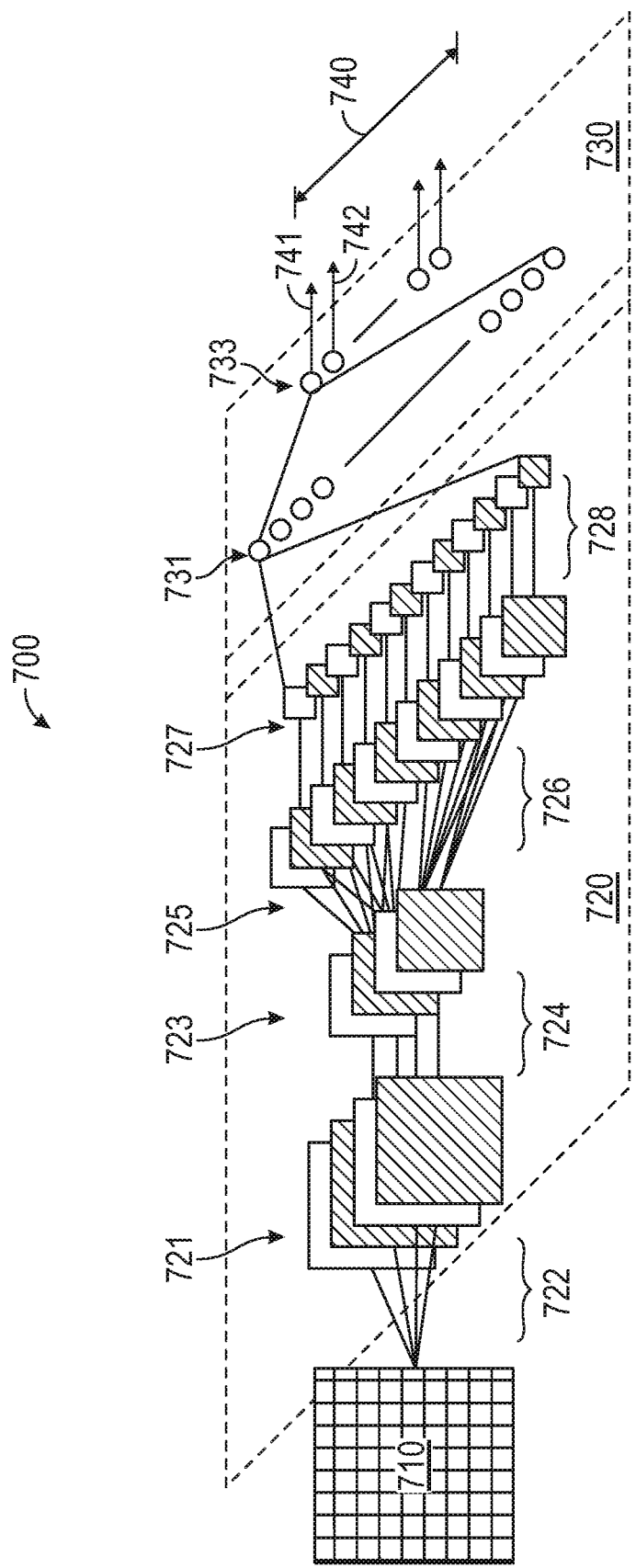
FIG. 7 is a block diagram of an exemplary convolutional neural network in accordance with various embodiments of the ground reference determination process of FIG. 6.

For example, referring now to FIG. 7, a convolutional neural network 700 may be utilized to classify roadway pixels. The convolutional neural network 700 receives an input image 710 (e.g., the image corresponding to when the lidar device 404, 508 scanned the field of view of the camera 402, 502) and produces a series of outputs 740 associated with whether and to what extent the roadway or ground is recognized within the image. However, it should be noted ground reference determination process 600 is not limited to convolutional neural networks, and in practice, a variety of additional or alternative machine learning techniques may be used, including, for example, recurrent neural networks (RNN), random forest classifiers, Bayes classifiers (e.g., naive Bayes), principal component analysis (PCA), support vector machines, linear discriminant analysis, and the like.

In general, convolutional neural network 700 implements a convolutional phase 722, followed by feature extraction 720 and classification 730. Convolutional phase 722 uses an appropriately sized convolutional filter that produces a set of feature maps 721 corresponding to smaller tilings of input image 710. As is known, convolution as a process is translationally invariant, that is, features of interest can be identified regardless of their location within image 710. Subsampling 724 is then performed to produce a set of smaller feature maps 723 that are effectively "smoothed" to reduce sensitivity of the convolutional filters to noise and other variations. Subsampling might involve taking an average or a maximum value over a sample of the inputs 721. Feature maps 723 then undergo another convolution 728, as is known in the art, to produce a large set of smaller feature maps 725. Feature maps 725 are then subsampled to produce feature maps 727.

During the classification phase 730, the feature maps 727 are processed to produce a first layer 731, followed by a fully-connected layer 733, from which outputs 740 are produced.

In general, the convolutional neural network 700 is trained by presenting it with a large number of input images and "clamping" outputs 740 based on roadway presence within the scene. Backpropagation as is known in the art is then used to refine the training convolutional neural network 700. The resulting convolutional neural network 700 is then implemented by a control module 34, 500, and subsequently, during normal operation, the trained convolutional neural network 700 is used to process images 710 received as vehicle 10, 400 travels through its environment and observes roadway regions within the images 710. The resulting outputs 740 are then utilized to classify pixels within the images 710 as belonging to the roadway.

In one or more embodiments, for purposes of the subject matter described herein, a fully connected convolutional neural network is used to classify each pixel as roadway or non-roadway based on the current image. The input to the convolutional neural network model is the current image, and the output is a binary map of the same size of the image, where each pixel on the map is assigned a value that represents whether or not the corresponding pixel in the image belongs to the roadway or ground. In one embodiment, the training of the convolutional neural network model is performed in a supervised fashion with labeled data.

Referring again to FIG. 6, the ground reference determination process 600 continues by selecting or otherwise obtaining the subset of ranging data corresponding to the field of view of a particular imaging device and utilizing the calibration transformation parameters associated with the respective pairing of imaging and ranging devices to map the points of the subset to corresponding pixel locations in the image reference frame associated with that imaging device at 606. In this regard, for each lidar point within the subset of the lidar point cloud data from a lidar device 404, 508 that overlaps the field of view of a respective camera 402, 502, the control module 34, 500 utilizes the calibration transformation parameter values associated with that device pairing to convert or otherwise map the respective lidar point from a three-dimensional coordinate location in the lidar point cloud reference frame to a two-dimensional pixel location in the image reference frame associated with that camera 402, 502. At 608, the ground reference determination process 600 continues by classifying or otherwise designating each point of ranging data mapped to a pixel location previously classified as belonging to the roadway or ground at 604 as a roadway ranging data point belonging to the roadway subset of ranging data. Thus, for each lidar point mapped to a roadway pixel location, the control module 34, 500 flags, tags, or otherwise designates that lidar point as a roadway point within the lidar point cloud data. As described above, steps 602, 604, 606 and 608 are performed for an individual scan by an individual lidar device 404, 508 with respect to each onboard camera 402, 502, to thereby classify the entire portion of the scan that is overlapped by the field of view by at least one of the cameras 402, 502.

In the illustrated embodiment, the ground reference determination process 600 continues by analyzing unclassified points within the ranging data that are adjacent to roadway ranging data points at 610 to augment the image-based classification of roadway ranging data points at 608. For example, for each roadway lidar point having an adjacent lidar data point within the lidar point cloud data from that lidar scan that was not classified as belonging to the roadway at 608, the control module 34, 500 determines whether the difference between the depth or distance associated with that unclassified lidar data point and the adjacent roadway lidar data point is less than a threshold value. In this regard, the threshold value is indicative of a substantially smooth or planar surface characteristic of a roadway. When the difference between an unclassified lidar data point and an adjacent roadway lidar data point is less than the threshold, the control module 34, 500 classifies, designates, or otherwise assigns that previously unclassified lidar data point to the roadway subset (e.g., by flagging, tagging, or otherwise marking that lidar data point accordingly).

In exemplary embodiments, after determining the roadway subset of ranging data from the scan, the ground reference determination process 600 continues by calculating or otherwise determining the orientation of the vehicle during the scan using the roadway subset of ranging data and roadway mapping data at 612. For example, the control module 34, 500 may utilize a coordinate location associated the current vehicle location from a positioning system 76, 506 to obtain mapping data corresponding to the pitch or elevation of the roadway surface at or around a coordinate location associated the current vehicle location from a data storage element 46, 504, and based on the relationship between the mapped roadway pitch or elevation information and the roadway subset of lidar points, the control module 34, 500 determines the current roll, pitch, and yaw of the vehicle with respect to the roadway surface (e.g., by determining variable values that minimize differences between data sets).

In exemplary embodiments, the ground reference determination process 600 also calculates or otherwise determines the location and heading of the vehicle during the scan using the non-roadway environmental subset of ranging data and mapping data at 614. In this regard, in a similar manner as described above at 612, the control module 34, 500 may utilize the coordinate location associated the current vehicle location to obtain high-resolution three-dimensional mapping data corresponding to the environment at or around the current vehicle location from a data storage element 46, 504. Based on the relationship between the mapped objects, obstacles, or other features captured by the mapping data and the environmental subset of lidar points, the control module 34, 500 determines the current three-dimensional location and heading of the vehicle in the reference coordinate frame associated with the mapping data (e.g., by determining variable values that minimize differences between data sets).

Once the current vehicle pose associated with the lidar scan is updated or otherwise determined at 612 and 614, the illustrated ground reference determination process 600 continues by identifying or otherwise determine regions of interest in the vicinity of the vehicle at 616 and analyzes those regions within the sensor data to detect and classify any objects or obstacles within those regions at 618. In one or more embodiments, regions of interest within images are identified based on the environmental subset of the lidar point cloud data. For example, control module 34, 500 may identify contiguous or continuous groupings of lidar points within the environmental subset that exhibit one or more physical characteristics that suggest the region should be analyzed for potential objects, such as, for example, an area, volume, or other size greater than a threshold size, an average depth or distance from the vehicle that is less than a threshold distance, or the like. In this regard, the control module 34, 500 may identify further subsets of the environmental lidar point subset that are likely to contain objects, obstacles, or other features likely to influence operation of the vehicle. Thereafter, the lidar points of the identified object subsets of environmental lidar data may be mapped to pixel locations associated with a camera 402, 502 having a field of view that overlaps those respective regions of lidar point cloud data (e.g., using the calibration transformation parameters associated with that pairing of camera 402, 502 and lidar device 404, 508) to identify regions of interest within the image from that camera 402, 502 temporally associated with the lidar scan of that area.

The control module 34, 500 may then select those regions of pixels from the image data provided by that camera 402, 502, and those pixel regions are then input or otherwise provided to a convolutional neural network or other image classification algorithm to classify or otherwise characterize the object at that location relative to the vehicle. In some embodiments, the depth or distances from the lidar points are also assigned to the pixels of the regions being analyzed, so that the image classification algorithms can leverage physical or dimensional characteristics to improve the accuracy of the classification. The classified type and/or state of the detected object may then be utilized to influence or otherwise commands for autonomously operating the vehicle to respond to the type or state of object at that location relative to the vehicle in the appropriate manner.

In some embodiments, regions of interest in the vicinity of the vehicle are also identified using the mapping data corresponding to the current location of the vehicle. For example, regions of image data likely to encompass a fixed object (such as traffic signals, traffic signs, or the like) can be identified based on the mapped location of the object relative to the vehicle. Using information about the respective poses of the onboard cameras 402, 502 and their fields of view with respect to the vehicle combined with the current vehicle pose from 612 and 614, the control module 34, 500 can determine which of the cameras 402, 502 has a field of view likely to encompass or overlap a mapped object. The location of the mapped object can then be mapped from the mapping data reference coordinate frame to corresponding pixel locations within the image reference frame associated with that identified camera 402, 502 using calibration transformation parameter values for converting between the camera coordinate frame associated with that camera 402, 502 and the vehicle reference frame and/or mapping data reference coordinate frame. Based on the correlated pixel locations for the mapped object, a region of pixels where the object is expected to be captured within the image from the camera 402, 502 can be identified or otherwise determined and provided to an image classification algorithm in a similar manner as described above. Again, lidar data that maps to the pixel region of interest may be utilized to improve the accuracy of the classification using physical or dimensional attributes associated with the pixel region.

Figure 8:
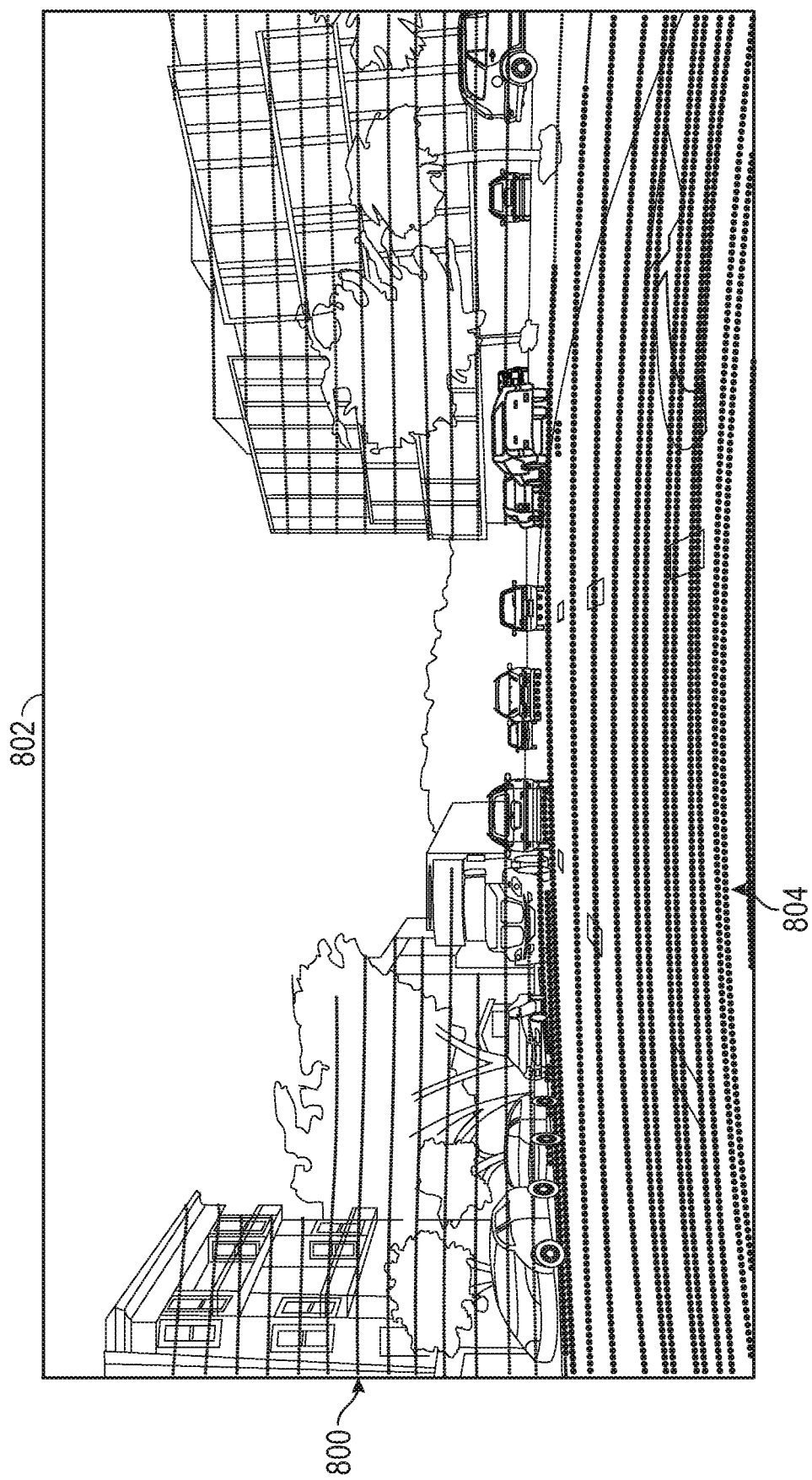
FIG. 8 depicts an exemplary image of an environment representative of a captured field of view of a camera onboard a vehicle and overlying ranging data from a ranging device onboard the vehicle suitable for use in conjunction with the ground reference determination process of FIG. 6 in accordance with one or more exemplary embodiments.

FIG. 8 depicts a graphical representation of lidar scan data 800 of an environment corresponding to a field of view of a camera overlaid on an image 802 of the environment captured by the camera. In accordance with the ground reference determination processes described above, a subset of points 804 of the lidar scan data 800 are classified as belonging to the roadway or ground based on the mapping between the image 802 and the lidar scan data 800 and the relative depths or distances of adjacent points of the lidar scan data 800. As described above, the roadway subset 804 of the lidar data 800 may be utilized to update or refine the vehicle pose, which, in turn is then utilized in conjunction with analyzing the non-roadway portion of the lidar scan data 800 and corresponding pixels of the image 802 to detect and classify objects within the environment, and the like.

By using image data to establish a ground reference subset of lidar point cloud data, the orientation of the vehicle can be determined more accurately. Additionally, once the image-classified lidar points are identified, additional lidar points may be classified or characterized as belonging to the ground based on having similar depths or distances as their adjacent lidar points previously classified as belonging to the ground. Thus, the resulting subset of lidar points utilized for the ground reference is more comprehensive, which improves accuracy and reliability of the vehicle orientation determinations. Additionally, excluding more ground points from the remaining environmental subset of lidar points improves the accuracy and reliability of vehicle localization based on surrounding environmental features, while also eliminating irrelevant or extraneous points from further object analysis.

For the sake of brevity, conventional techniques related to signal processing, data transmission, signaling, imaging, ranging, synchronization, calibration, control systems, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method of controlling a vehicle, the method comprising:
   obtaining, by a control module onboard the vehicle, image data from an imaging device onboard the vehicle;
   classifying, by the control module, portions of the image data as ground;
   obtaining, by the control module from a sensing device onboard the vehicle, sensor data corresponding to a field of view of the imaging device;
   obtaining, by the control module, calibration data associated with the sensing device;
   converting the sensor data corresponding to the field of view of the imaging device to a reference frame associated with the image data;
   classifying, by the control module, a subset of the sensor data converted to locations in the reference frame corresponding to the portions of the image data as ground based on a correlation between the subset of the sensor data and the portions of the image data; and
   operating, by the control module, one or more actuators onboard the vehicle in a manner that is influenced by the subset of the sensor data classified as ground.

2. The method of claim 1, wherein converting the sensor data comprises transforming the sensor data from a three-dimensional reference frame to the reference frame associated with the image data, wherein the reference frame associated with the image data is two-dimensional.

3. The method of claim 1, further comprising:
   obtaining, by the control module, mapping data corresponding to a location of the vehicle; and
   determining, by the control module, an orientation of the vehicle based at least in part on the subset of the sensor data classified as ground and the mapping data, wherein operating the one or more actuators comprises determining a command for operating the one or more actuators based at least in part on the orientation of the vehicle.

4. The method of claim 1, further comprising:
   determining, by the control module, an environmental subset of the sensor data based at least in part on the subset of the sensor data classified as ground;
   obtaining, by the control module, mapping data corresponding to a location of the vehicle; and
   determining, by the control module, a pose of the vehicle based at least in part on the environmental subset of the sensor data and the mapping data, wherein operating the one or more actuators comprises determining a command for operating the one or more actuators based at least in part on the pose of the vehicle.

5. The method of claim 4, further comprising:
   identifying, by the control module, a region of the environmental subset;
   obtaining, by the control module, calibration data associated with the sensing device;
   converting, by the control module, the region of the environmental subset to an object region in a reference frame associated with the image data;
   assigning, by the control module, one or more attributes to the object region of the image data based at least in part on the region of the environmental subset; and
   identifying, by the control module, an object within the object region based at least in part on the one or more attributes, wherein determining the command for operating the one or more actuators comprises determining the command based at least in part on the pose of the vehicle in a manner that is influenced by the object.

6. The method of claim 1, wherein classifying the portions of the image data comprises applying a convolutional neural network to the image data to classify pixels belonging to a roadway.

7. The method of claim 1, further comprising augmenting the subset of the sensor data based on relative differences associated with adjacent points of the sensor data, resulting in an augmented image-classified roadway subset of the sensor data, wherein operating the one or more actuators comprises operating the one or more actuators in a manner that is influenced by the augmented image-classified roadway subset of the sensor data.

8. A non-transitory computer-readable medium having instructions stored thereon that are executable by the control module to perform the method of claim 1.

9. A vehicle, comprising:
   an imaging device onboard the vehicle;
   a ranging device onboard the vehicle;
   a data storage element to maintain calibration data associated with a relationship between the imaging device and the ranging device;
   one or more actuators onboard the vehicle; and
   a controller that, by a processor, obtains image data from the imaging device, classifies portions of the image data as ground, obtains ranging data from the ranging device, obtains the calibration data from the data storage element, identifies a ground subset of the ranging data converted to locations in a reference frame associated with the image data corresponding to the portions of the image data using the calibration data to convert the ranging data corresponding to a field of view of the imaging device to the reference frame, and operates the one or more actuators onboard the vehicle in a manner that is influenced by the ground subset of the ranging data.

10. The vehicle of claim 9, wherein:
the imaging device comprises a camera; and
the ranging device comprises a light detection and ranging (lidar) device.

11. The vehicle of claim 10, wherein:
the portions of the image data as ground comprise pixel locations in an image reference frame;
the ranging data comprises a lidar point cloud; and
the ground subset comprises points of the lidar point cloud mapped from a three-dimensional reference frame to the pixel locations in the image reference frame using the calibration data.

12. The vehicle of claim 9, further comprising a map database including roadway pitch data, wherein the controller is coupled to the map database to obtain a subset of the roadway pitch data corresponding to a location of the vehicle, determine an orientation of the vehicle based at least in part on a relationship between the subset of the roadway pitch data and the ground subset of the ranging data, and determines a command for operating the one or more actuators onboard the vehicle in a manner that is influenced by the orientation of the vehicle.

13. The vehicle of claim 9, further comprising a map database including environmental mapping data, wherein the controller is coupled to the map database to obtain a subset of the environmental mapping data corresponding to a location of the vehicle, determine an environmental subset of the ranging data based at least in part on the ground subset of the ranging data, determine a pose of the vehicle based at least in part on a relationship between the environmental subset of the ranging data and the subset of the environmental mapping data, and determines a command for operating the one or more actuators onboard the vehicle in a manner that is influenced by the pose of the vehicle.

14. The vehicle of claim 13, wherein the controller identifies a region of the environmental subset, assigns one or more attributes to an object region of the image data corresponding to the region of the environmental subset using the calibration data, and identifies an object within the object region based at least in part on the one or more attributes, wherein the command is influenced by the object.

15. The vehicle of claim 9, wherein the portions of the image data comprise pixels classified as belonging to a roadway using a convolutional neural network.

16. A method of controlling a vehicle, the method comprising:
obtaining, by a control module onboard the vehicle, an image from a camera onboard the vehicle;
characterizing, by the control module, pixels of the image as belonging to a roadway;
obtaining, by the control module, ranging data corresponding to the image from a ranging device onboard the vehicle;
classifying, by the control module, a subset of the ranging data as the roadway based on a mapping of the subset of the ranging data to locations of the pixels using calibrated transformation parameters associated with a relationship between the camera and the ranging device, wherein classifying the subset comprises partitioning the ranging data corresponding to the image into environmental and roadway subsets based on the mapping, the roadway subset of the ranging data including the subset of the ranging data mapped to the locations of the pixels; and
autonomously operating, by the control module, one or more actuators onboard the vehicle in a manner that is influenced by the subset of the ranging data classified as the roadway.

17. The method of claim 16, wherein autonomously operating the one or more actuators comprises:
determining a current vehicle pose based at least in part on the partitioning of the ranging data into the environmental and roadway subsets; and
determining one or more commands for operating the one or more actuators based at least in part on the current vehicle pose.

18. The method of claim 16, further comprising augmenting the subset of the ranging data to include additional points of the ranging data based on relative differences between the additional points and adjacent ones of the subset of ranging data, the augmenting resulting in an augmented image-classified roadway subset of the ranging data, wherein the autonomous operation of the one or more actuators is influenced by the augmented image-classified roadway subset of the ranging data.

* * * * *